(12) United States Patent
Jodicke

(10) Patent No.: US 7,916,379 B2
(45) Date of Patent: Mar. 29, 2011

(54) ELECTROCHROMIC ELEMENTS USING ANTIOXIDANTS TO SUPPRESS SELF-DISCHARGING

(75) Inventor: Dirk Jodicke, Furth im Wald (DE)

(73) Assignee: Econtrol-Glas GmbH & Co. KG, Furth Im Wald (DE)

( * ) Notice: Subject to any disclaimer, the term of this patent is extended or adjusted under 35 U.S.C. 154(b) by 0 days.

(21) Appl. No.: 12/388,259

(22) Filed: Feb. 18, 2009

(65) Prior Publication Data
US 2009/0225393 A1 Sep. 10, 2009

(30) Foreign Application Priority Data

Feb. 19, 2008 (EP) .................................... 08003029

(51) Int. Cl.
*G02F 1/15* (2006.01)
(52) U.S. Cl. ....................................................... 359/265
(58) Field of Classification Search .................. 359/265, 359/273
See application file for complete search history.

(56) References Cited

U.S. PATENT DOCUMENTS

| | | | |
|---|---|---|---|
| 5,241,411 A | 8/1993 | Arribart et al. | |
| 5,379,146 A | 1/1995 | Defendini | |
| 5,501,919 A | 3/1996 | Paul et al. | |
| 5,859,723 A | 1/1999 | Jodicke et al. | |
| 5,998,617 A | 12/1999 | Srinivasa et al. | |
| 6,020,423 A | 2/2000 | Jodicke et al. | |
| 6,157,479 A | 12/2000 | Heuer et al. | |
| 6,353,493 B1 | 3/2002 | Guarr et al. | |
| 7,595,011 B2 * | 9/2009 | Kanouni et al. | 252/583 |
| 2003/0031858 A1 | 2/2003 | Bronstert | |
| 2005/0213186 A1 | 9/2005 | Kokeguchi et al. | |
| 2006/0159610 A1 | 7/2006 | Stenzel et al. | |

FOREIGN PATENT DOCUMENTS

| | | |
|---|---|---|
| DE | 44 17 219 A1 | 12/1995 |
| DE | 692 13 833 T2 | 4/1997 |
| DE | 695 28 148 T2 | 1/2003 |
| DE | 600 03 773 T2 | 6/2004 |
| DE | 103 27 517 A1 | 1/2005 |
| EP | 1 283 436 A2 | 2/2003 |
| FR | 2 690 536 A1 | 10/1993 |
| WO | WO 02/40578 A1 | 5/2002 |

* cited by examiner

*Primary Examiner* — Joseph Martinez
(74) *Attorney, Agent, or Firm* — Marshall & Melhorn, LLC

(57) ABSTRACT

The invention relates to the use of antioxidants of different kinds and concentrations in electrochromic elements having an ion conducting component to suppress self-discharging. In comparison to electrochromic elements known from prior art, electrochromic elements according to the invention show a significantly smaller increase in transmissivity for a period of time after the electric current necessary to decrease transmissivity is switched off. The use of sterically hindered amines and/or 1,3,5-trisubstituted phenols has proven particularly effective for this purpose.

9 Claims, 1 Drawing Sheet

ELECTROCHROMIC ELEMENTS USING ANTIOXIDANTS TO SUPPRESS SELF-DISCHARGING

BACKGROUND

1. Field of the Invention

The invention relates to the field of electrochromic elements which are often fitted onto or between transparent substrates and which facilitate the variation in transparency of such systems when an electric current is applied.

2. Background of the Invention

Electrochromic elements known from prior art most often consist of two transparent substrates, for example, made from glass or plastic. The substrates are connected to each other by way of a centrally placed ion conducting component, which is surrounded on both sides by an electrode and an electrochromic coating. Appropriately, the electrodes are also made from a transparent material, which is possible when using, for example, doped metal oxides such as aluminium-doped zinc oxide, fluoride-doped tin oxide or also indium-doped tin oxide-TCO materials in general. Materials used for a first electrochromic coating (EC1) are, for example, tungsten oxide, molybdenum oxide, nickel oxide or also iridium oxide. Materials used for the second electrochromic coating (EC2) could, for example, include cerium oxide, titanium oxide, vanadium oxide, niobium oxide, tantalum oxide or also mixtures of the above mentioned metal oxides. The ion conducting component is often manufactured on the basis of modified polyvinyl butyrals, polyethylene oxides, polyethyleneimines or polyacrylates.

The use of modified polyvinyl butyrals is known from DE 103 27 517 and WO 02/40578. Patent documents FR 2,690, 536, U.S. Pat. No. 5,241,411 and DE 692 138 33 relates to the use of modified polyethylene oxide and polyethyleneimine for the same purpose. The use of acrylates and other polymers is already well known from EP 1,283,436, DE 695 281 48 and DE 4 417 219.

Electrochromic elements having an ion conducting component accordingly typically have the following structure:

Substrate-TCO-EC1-Ion Conducting Component-EC2-TCO-Substrate

Electrochromic elements of this construction will change transmissivity when an electric current is applied to them. If the electrochromic element components EC1 are negatively charged by the relevant TCO electrode the electrochromic element will darken. If the polarity is then reversed (i.e., if a positive charge is applied to the EC1 component and a negative charge is applied to the EC2 component), then decolorization or bleaching (i.e., an increase in transmissivity in comparison to the original setting of the electrochromic elements) will occur.

An important characteristic of this electrochromic element, which is already well known in prior art, is that an electric current must be applied to the electrochromic components to change optical transmissivity—both to decrease and increase transmissivity, but not to maintain it.

Other implementations of electrochromic elements are also known but they have the disadvantage that a permanent current must be applied not only to increase transmissivity, but also to maintain it. On the other hand, such electrochromic elements consist of two substrates which each are fitted with a transparent electrode on one side, for example, in the form of a TCO material and a gel containing redox pairs which locks the substrates in between it in such a way that both sides of the gel coating are in contact with a TCO electrode. The gel coating containing redox pairs has viologenes, which can reduce or oxidize when an electric current is applied. This chemical conversion process occurs in connection with the electrochromic element changing its transmissivity. This implementation of an electrochromic element also has the disadvantage that each reverse reaction of the previously induced oxidization or, as the case may be, reduction spontaneously ends when the electric current is removed and therefore always results in an increase of transmissivity. This is advantageous if such electrochromic systems are used in, for example, cars. In this case it is important that these electrochromic elements automatically will bleach or switch to a highly transmissive state when the current supply is cut off. Such electrochromic elements on the basis of viologenes and other redox pairs are known from U.S. Pat. No. 5,998,617 and DE 60 003 773.

A gel with electrochromic elements having redox pairs typically has the following structure:

Substrate-TCO-Gel with Redox Pairs-Substrate

In comparison to electrochromic elements with an ion conducting component that employ an electric current to adjust transmissivity which does not change at all or only little, a gel with electrochromic elements having redox pairs bleaches or increases in transmissivity a few seconds or minutes after the electric current has been removed. Electrochromic elements having an ion conducting component are thus much more stable and resistant to self-bleaching than a gel with electrochromic elements having redox pairs. However, after the current has been removed the stability in the low transmissivity state for the first-mentioned electrochromic element is only guaranteed at moderate temperatures under 30-35° C. In comparison, in the implementation of electrochromic elements at higher temperatures of, for example, 50° C., a constant increase in its transmissivity occurs even without applying an electric current. Furthermore, the speed of the bleaching for these electrochromic elements is characterized by being distinctly temperature dependent; the higher the temperature the electrochromic element is exposed to, the faster transmissivity rises. Particularly in the summer months, the operating temperatures of architectural glass having electrochromic elements are between 50 and 60° C., often even between 70-80° C. At such high temperatures a corresponding rise in transmissivity is clearly evident. An electrochromic element having an ion conducting component also shows obvious bleaching within a few days. In practice this means that an operator has to darken the architectural glass having one electrochromic element at regular intervals to properly use the darkening effect. To do this effectively, it is necessary to make regular transmissivity measurements, which is impractical.

From a phenomenological standpoint, the rise in transmissivity occurs as a consequence of dispersement of freely mobile charge carriers. The dispersed charge is therefore no longer available for use by the operator of electrochromic elements to subsequently induce a reduction of transmissivity by means of an applied electric current.

It is the object of the invention to develop an electrochromic element that after its transmissivity has been lowered by being exposed to an electric current for a short time, it will stabilize to the adjusted transmissivity degree for a long period of time after the electric current has been removed even while being exposed to high temperatures, in other words, it will only show limited bleaching.

BRIEF SUMMARY OF THE INVENTION

One aspect of the invention relates to a process for suppressing self-discharging in an electrochromic element, comprising adding at least one antioxidant with a first concentration to an electrochromic element having an ion conducting component. Another aspect of the invention relates to optionally adding the ion conducting component to the at least one antioxidant.

Another aspect of the invention relates to an electrochromic element comprising first and second electrodes that are substantially optically transparent and electrically conducting, first and second electrochromic layers, and an ion conducting component containing an antioxidant.

DETAILED DESCRIPTION OF THE INVENTION

Figure 1:
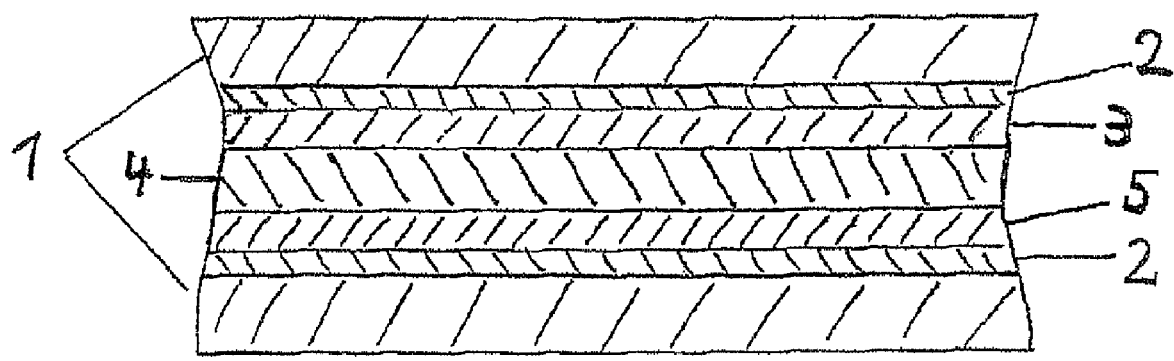
FIG. 1 is an electrochromic element with the ion conducting component arranged in accordance with the invention.

The object of the invention is achieved in such a manner that the self-discharging that causes the rise in transmissivity can be partly or completely suppressed by means of antioxidants of different types and concentrations in an electrochromic element having an ion conducting component.

Systems in accordance with the invention show a significantly smaller increase in the optical transmissivity than electrochromic elements known from prior art even at high temperature fluctuation, for example, between −20° C. and +70° C. over very long periods of time (approximately longer than 100 hours).

In one embodiment of the invention at least one antioxidant is added to the ion conducting component whereby it should be pointed out that the point and purpose of adding an antioxidant cannot be related to its ability to suppress photo-oxidant degradation since such a process usually involves the deterioration caused by oxygen and UV-rays neither of which occurs with the elements in accordance with the invention, not during the manufacturing either. Photo-oxidant degradation of polymers in the ion conducting component at no point occurs.

In another embodiment of the invention the performing polymer of the ion conducting component contains 68% by weight n-butyl acrylate and 11% by weight 1,4-butanediol monoacrylate. The remaining 21% by weight mainly contains a softener, a conducting salt and a suitable catalyst for the polymerization (hardening). The stabilizing effect according to the invention is achieved by adding 0.1 to 3.0% by weight of a sterically hindered amine, such as, bis(1-octyloxy-2,2,6, 6-tetramethyl-4-piperidyl)sebacat and 0.1 to 2.0% by weight of a 1,3,5-trisubstituted phenol, such as, 1,3,5-trimethyl-2,4, 6-tris(3,5-di-tert-butyl-4-hydroxylbenzyl)benzol. Additional examples of possible polymer composition for ion conducting components are as follows:

1. 55% by weight n-butyl acrylate, 20% by weight 2-ethylhexyl acrylate 10% by weight 1,4-butandiolmono acrylate, 12% by weight g-butyrolactone, 1.8% by weight lithium perchlorate, 0.4% by weight of a catalyst, 0.5% by weight of a sterically hindered amine and 0.3% by weight of a 1,3,5-trisubstituted phenol.
2. 69% by weight n-butyl acrylate, 15% by weight 1,4-butanediol monoacrylate, 13% by weight propylene carbonate, 2% by weight lithium perchlorate, 0.3% by weight of a catalyst, 0.5% by weight of a sterically hindered amine and 0.2% by weight of a 1,3,5-trisubstituted phenol.
3. 72.5% by weight n-butyl acrylate and 11.0% by weight 1,4-butanediol monoacrylate, 1.0% by weight 1,4-butanediol diacrylate, 12.0% by weight y-butyrolactone, 2.0% by weight lithium perchlorate, 0.3% by weight of a catalyst, 0.8% by weight of a sterically hindered amine and 0.4% by weight of a 1,3,5-trisubstituted phenol.
4. Polyvinyl butyral, additionally a softener and a conducting salt in accordance with patent numbers DE 103 27 517 and WO 02/40578, additionally 0.5% by weight of a sterically hindered amine and 0.3% by weight of a 1,3,5-trisubstituted phenol.

In all three above mentioned polymer compositions, the last two mentioned additions of sterically hindered amines and 1,3,5-trisubstituted phenol constitute the addition of antioxidants in accordance with the invention. According to the invention it is also possible, in addition to adding individual sterically hindered amines or 1,3,5-trisubstituted phenol, to add a mixture of at least one sterically hindered amine and at least one 1,3,5-trisubstituted phenol for the same purpose.

Advantageous implementations of the object in accordance with the invention also allow for the use of derivatives of the above described antioxidants. Suitable sterically hindered amines are in the simplest case di-tert-butylamine or 2,2,6,6-tetramethylpiperidine. Also, 1,5-tert-butyl-3-methyl phenol or 1,3,5-tri-tert-butyl phenol are the simplest examples of suitable 1,3,5-trisubstituted phenol in accordance with the invention.

FIG. 1 shows the composition of an electrochromic element in accordance with the invention. The shown layer structure consists of a first substrate 1, a layer on top which functions as an electrode and is made from an electric conducting transparent material 2, for example, a TCO, a layer on top made from a first electrochromic material 3, an ion conducting component 4 with at least one antioxidant, a second electrochromic layer 5, an additional layer which functions as an electrode and is made from a transparent but conducting material 2 as well as a sealing substrate 1.

In this respect, the substrate materials can be freely chosen but they must be optically transparent to facilitate effective impact of the electrochromic effect when the electric current is applied. It could, for example, be glass or transparent plastic. All TCO materials qualify to function as an electrode by being transparent but electrically conducting (e.g., doped metal oxide such as aluminium-doped zinc oxide, fluoride-doped tin oxide or indium-doped tin oxide). Candidates as materials for use in the first electrochromic layer 3 could, for example, be tungsten oxide, molybdenum oxide, nickel oxide or iridium oxide. For the second electrochromic layer 5 materials such as peroxide, titan oxide, vanadium oxide, niobium oxide, tantalum oxide or suitable mixtures thereof are suitable. The ion conducting component 4 can be manufactured on the basis of modified polyvinyl butyrals, polyethylene oxides, polyethyleneimines or polyacrylates. These acquire their stability with regard to transmissivity in accordance with the invention by adding sterically hindered amines and/or 1,3,5-trisubstituted phenols.

The characteristics of the invention revealed in the above specification, in the drawing, as well as in the patent claims, could be significant for the realization of the invention individually as well as in any combination.

What is claimed is:
1. A process for limiting bleaching in an electrochromic element, comprising adding at least one antioxidant with a first concentration to an electrochromic element having an ion conducting component to suppress self-discharging in the electrochromic element, wherein the at least one antioxidant is added to the ion conducting component and comprises at least one 1,3,5-trisubstituted phenol of a first concentration and at least one sterically hindered amine of a second concentration.

2. A process for suppressing self-discharging in an electrochromic element according to claim 1, wherein the at least one sterically hindered amine is di-tert-butylamine, 2,2,6,6-tetramethylpiperidine, or a derivative of either.

3. A process for suppressing self-discharging in an electrochromic element according to claim 1, wherein the at least one 1,3,5-trisubstituted phenol is 1,5-tert-butyl-3-methyl phenol or 1,3,5-tri-tert-butyl phenol.

4. A process for suppressing self-discharging in an electrochromic element according to claim 1, wherein the at least one antioxidant contains approximately 0.1-2.0% by weight of the at least one 1,3,5-trisubstituted phenol.

5. An electrochromic element showing limited bleaching, comprising:
 first and second electrodes that are substantially optically transparent and electrically conducting;
 first and second electrochromic layers; and
 an ion conducting component containing an antioxidant to suppress self-discharging in the electrochromic element, wherein the antioxidant comprises at least one 1,3,5-trisubstituted phenol of a first concentration and at least one sterically hindered amine of a second concentration.

6. An electrochromic element according to claim 5, wherein the sterically hindered amine is di-tert-butylamine, 2,2,6,6-tetramethylpiperidine, or a derivative of either.

7. An electrochromic element according to claim 5, wherein the antioxidant contains approximately 0.1-3.0% by weight of the sterically hindered amine.

8. An electrochromic element according to claim 5, wherein the 1,3,5-trisubstituted phenol is 1,5-tert-butyl-3-methyl phenol or 1,3,5-tri-tert-butyl phenol.

9. An electrochromic element according to claim 5, wherein the antioxidant contains approximately 0.1-2.0% by weight of the 1,3,5-trisubstituted phenol.

* * * * *